(12) United States Patent
Yong et al.

(10) Patent No.: US 11,822,734 B1
(45) Date of Patent: Nov. 21, 2023

(54) KEYBOARD VIDEO MOUSE AUTOMATED SETUP WITH PLURAL INFORMATION HANDLING SYSTEMS

(71) Applicant: Dell Products L.P., Round Rock, TX (US)

(72) Inventors: Khang Chian Yong, Singapore (SG); Vui Khen Thien, Singapore (SG); Michael Hock Meng Peh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 17/731,674

(22) Filed: Apr. 28, 2022

(51) Int. Cl.
G06F 3/023 (2006.01)
G06F 9/451 (2018.01)
G06F 3/0354 (2013.01)
G06F 3/0489 (2022.01)

(52) U.S. Cl.
CPC .......... *G06F 3/023* (2013.01); *G06F 3/03543* (2013.01); *G06F 9/453* (2018.02); *G06F 3/0489* (2013.01)

(58) Field of Classification Search
CPC ...... G06F 3/023; G06F 3/03543; G06F 9/453; G06F 3/0489
See application file for complete search history.

(56) References Cited

U.S. PATENT DOCUMENTS

| | | | |
|---|---|---|---|
| 7,472,217 B2 | 12/2008 | Lou et al. | |
| 8,015,332 B2 | 9/2011 | Kobayashi | |
| 8,136,042 B2 | 3/2012 | Holovacs et al. | |
| 8,176,226 B2 | 5/2012 | Hsueh et al. | |
| 8,209,438 B2 | 6/2012 | Bauch et al. | |
| 8,374,889 B2 | 2/2013 | Arthur | |
| 8,484,403 B2 | 7/2013 | Wu et al. | |
| 8,671,235 B2 | 3/2014 | Tung et al. | |
| 9,286,460 B2 | 3/2016 | Soffer et al. | |
| 9,378,703 B2 | 6/2016 | Nakano | |
| 9,423,884 B2 | 8/2016 | Yasuno et al. | |
| 10,276,131 B2 | 4/2019 | Ballard et al. | |
| 10,585,731 B2 | 3/2020 | Soffer | |
| 11,334,173 B2 | 5/2022 | Soffer | |
| 2008/0062121 A1* | 3/2008 | Huang | G06F 3/023 345/156 |

(Continued)

OTHER PUBLICATIONS

U.S. Appl. No. 17/667,079, filed Feb. 8, 2022, entitled "Multi-KVM Multi-Client Information Handling System Support," by inventors Vui Khen Thien and Tze Fung Chung.

*Primary Examiner* — Amit Chatly
(74) *Attorney, Agent, or Firm* — ZAGORIN CAVE LLP; Robert W. Holland

(57) ABSTRACT

A display keyboard video mouse (KVM) switch detects cables connected to ports of the display and compares the cable types against a configuration table to select a configuration user interface for presentation at the display retrieved from non-transitory memory of the display by a processing resource of the KVM switch. As an end user adjusts the cables connected to the display KVM switch, logic executing on the display adjusts the presentation of the configuration user interface to guide connections with plural information handling systems based upon the cable types and to confirm correct association of keyboard and mouse inputs through the KVM switch with each information handling system.

16 Claims, 9 Drawing Sheets

(56) References Cited

U.S. PATENT DOCUMENTS

| | | |
|---|---|---|
| 2008/0126629 A1 | 5/2008 | Huang |
| 2008/0147922 A1 | 6/2008 | Chou |
| 2010/0180055 A1* | 7/2010 | Lyon ................... G06F 3/038 |
| | | 710/316 |
| 2017/0337150 A1* | 11/2017 | Zhong ................ G02B 6/4471 |
| 2018/0302407 A1* | 10/2018 | Sekaran ................ G06F 21/82 |
| 2020/0145711 A1* | 5/2020 | Adolfsson ............ H04B 5/0031 |
| 2020/0150936 A1* | 5/2020 | Singh .................... G06F 9/453 |

* cited by examiner

KEYBOARD VIDEO MOUSE AUTOMATED SETUP WITH PLURAL INFORMATION HANDLING SYSTEMS

BACKGROUND OF THE INVENTION

Field of the Invention

The present invention relates in general to the field of information handling system peripherals, and more particularly to a keyboard video mouse automated setup with plural information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with processing components disposed in a housing, such as central processing unit (CPU) that executes instructions to process information in cooperation with a memory that stores the instructions and information. End users interact with information handling systems through input/output (I/O) devices, such as a display, keyboard and mouse. An information handling system typically interfaces with a peripheral display through a cable, such as a DisplayPort, HDMI, or USB Type-C cable, that has a fairly significant bandwidth. In contrast, keyboard and mouse peripheral can interface through cables that have less bandwidth capability and demands. In addition, information handling systems also often interface with a network through a cable, such as a Cat V internet cable.

In a business enterprise office environment, end users often work in office spaces on a temporary basis. A typical office space has a peripheral display, keyboard and mouse interfaced with a stationary information handling system, such as a desktop or tower system. The end user can use the local resources by signing into the information handling system and accessing resources and information through a network. Often the end user will have a portable information handling system that the end user may prefer to use instead of a shared resource. In some instances, the end user may decide to interface the portable information handling system with the peripheral resources instead of relying on the integrated display and keyboard of the portable system. To help with this scenario, displays sometimes include a keyboard video mouse (KVM) switch so that an end user can interface the portable system to the display and then switch between interacting with the portable or stationary system. The KVM switch can also switch data, such as with a Cat V cable into the switch, and provide a remote interface with an information handling system through the network.

The convenience of a display with a KVM switch and increasing reliance on work-from-home has led to increased adoption of displays with KVM switches in the home office environment. One difficulty with home use of KVM switches is that typical end users have difficulty setting up the display and KVM switch. For instance, some cable connections, like USB-C, support both video and data communications through a single interface, while other cable connections, like HDMI and most versions of DisplayPort, need a separate data cable to interface with a KVM switch. Although USB-C typically has the bandwidth to support both video and data, in some instances a USB-C port of an information handling system may not include video, such as when the USB-C port does not interface with the information handling system GPU. End users can become confused when interfacing the cables and attempting to interact with the information handling systems. As a result, a display with integrated KVM capabilities might only be used in a single system interface configuration.

SUMMARY OF THE INVENTION

Therefore, a need has arisen for a system and method which executes locally at a display keyboard video mouse (KVM) switch to present a configuration user interface that coordinates end user setup of plural information handling systems.

In accordance with the present invention, a system and method are provided which substantially reduce the disadvantages and problems associated with previous methods and systems for configuration of a display KVM switch to interface plural information handling systems with the display panel, keyboard and mouse. A processing resource of the KVM switch executes instructions stored in non-transitory memory to detect the types of cables that couple to the display and applies the cable type to select for presentation configuration user interfaces stored in the non-transitory memory that direct an end user towards completion of KVM setup.

More specifically, a display includes a display panel that presents information communicated from an information handling system as visual images and includes a keyboard video mouse (KVM) switch so that a peripheral keyboard and mouse coupled to ports of the display cooperate with each of plural information handling systems that selectively present visual images at the display panel. The information handling systems interface with the display KVM switch by different types of cables, such as video-only, data-only and video/data cables, which the KVM switch detects and applies to select configuration user interfaces from a configuration table. Once the information handling systems and peripherals are coupled to the display, the KVM setup wizard runs instructions on the KVM processing resource that select one information handling system to present movement of the mouse and presents a configuration user interface that coordinates end user mouse inputs to confirm or non-confirm that the KVM switch has correctly associated information handling systems with cables coupled to the port. If the KVM configuration is non-confirmed, the end user may reverse the configuration based upon instructions presented by the configuration user interface, such as by pressing an input button of the display or entering a predetermined keyboard or mouse input that is communicated from the information handling system that receives the peripheral inputs to the KVM switch setup wizard.

The present invention provides a number of important technical advantages. One example of an important technical advantage is that a display KVM switch executes instructions locally stored to present configuration user interfaces that are locally stored in response to detection of the types of cables coupled to the KVM switch so that an end user is directed through the display setup to interface with plural information handling systems. A self-contained setup wizard directs end user interactions with the KVM switch using resources of the KVM switch so that setup of plural information handling systems can be performed in a seamless manner that responds to end user actions, such as by monitoring cable ports for cable interfaces and selecting a configuration user interface for presentation in response to the end user actions. Logical actions map cable types to configuration user interface selection to associate video-only, data-only and video/data cable with keyboard and mouse interactions so that an end user can self-configure a display KVM switch to correctly associate information handling system visual image presentation and peripheral device interactions through a shared display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display includes a keyboard video mouse (KVM) switch that includes instructions and configuration user interfaces in non-transitory memory to coordinate interfaces with plural information handling systems through different types of video, data and video/data cables. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
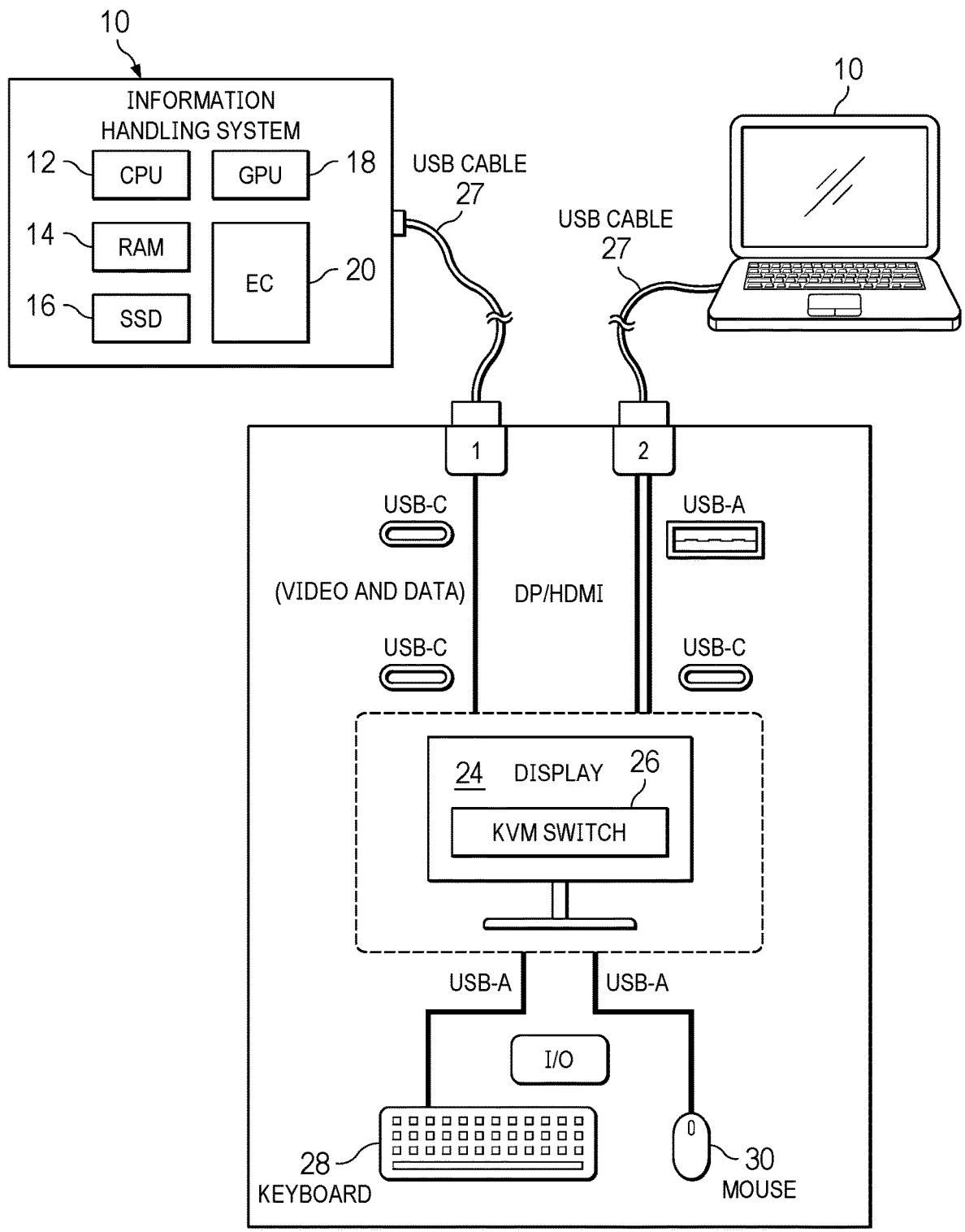
FIG. 1 depicts a block diagram of a display having a keyboard video mouse (KVM) switch interfaced with plural information handling systems with coordination through a KVM setup wizard.

Referring now to FIG. 1, a block diagram depicts a display 24 having a keyboard video mouse (KVM) switch 26 interfaced with plural information handling systems 10 with coordination through a KVM setup wizard. The example embodiment includes a block diagram of a desktop information handling system 10 to illustrate processing components that cooperate to process information. A central processing unit (CPU) 12 executes instructions to process information in cooperation with a random access memory (RAM) 14 that stores the instructions and information. A solid state drive (SSD) 16 has non-transient memory, such as flash memory, that provides persistent storage of information. For example, SSD 16 stores an operating system and applications that are retrieved on power up to RAM 14 for execution by CPU 12. A graphics processing unit (GPU) 18 further processes information to generate definitions of visual images for presentation at display 24, such as pixel values that are scanned to pixels of a display panel to define colors that create a composite image. An embedded controller 20 manages information handling system physical operating constraints, such as application of power and thermal management. In addition, embedded controller 20 supports interactions with peripheral devices, such as mouse and keyboard. In the example embodiment, one of the information handling systems has a stationary configuration and the other has a portable configuration that includes an integrated display for presenting visual images. For instance, the hardware of FIG. 1 might represent an enterprise workplace, such as a cube, that includes a stationary system and also supports the end user's access to a portable system with peripheral presentation of images and interaction with input devices.

Display 24 has a peripheral configuration that accepts visual images from an external information handling system for presentation as visual images. In the example embodiment, each information handling system 10 interfaces with display 24 through a USB Type C cable 27 that communicates both visual image information and data, such as peripheral input data. USB Type C cables interface with KVM switch 26 so that an end user can select which information handling system presents visual images at display 24 and accepts inputs from peripheral devices, such as keyboard 28 and mouse 30 that communicate through USB Type-A cables and ports. An end user of information handling systems 10 toggles KVM switch 26 to alternatively select interaction with each information handling system by switching information with KVM switch 26 between display 24, keyboard 28, mouse 30 and the selected information handling system. In the example embodiment, display 24 may have a variety of different ports to support communication with the information handling systems. Some ports, such as USB-C and DisplayPort, have two-way information transfer so that visual information is communicated from information handling system 10 to KVM switch 26 over the same cable and port as peripheral information that is communicated to information handling system 10. Other ports are restricted to communication of video only information in one direction, such as HDMI, or data only, such as USB-A. These different capabilities can lead to confusion when an end user configures KVM switch 26 since full use of the display and input devices typically needs bidirectional communication. In some embodiments, other types of ports may be included, such as CAT V network ports that can support bidirectional communication with a distal information handling system through a network interface and also provide network communications to information handling systems that couple to KVM switch 26. Specifically, HDMI and DisplayPort only provide video capability without bidirectional communication that supports mouse or keyboard inputs from the display to an information handling system. (Note that DisplayPort version 1.2 had "FAUX" capability but it was deprecated in later revisions). USB-A typically lacks bandwidth to communicate video information and instead is data-only. USB-C has bandwidth to provide both video and data transfer so that it is always data capable, however, in some instance USB-C ports do not interface with video at an information handling system and may therefore be data-only or video/data capable.

Figure 2:
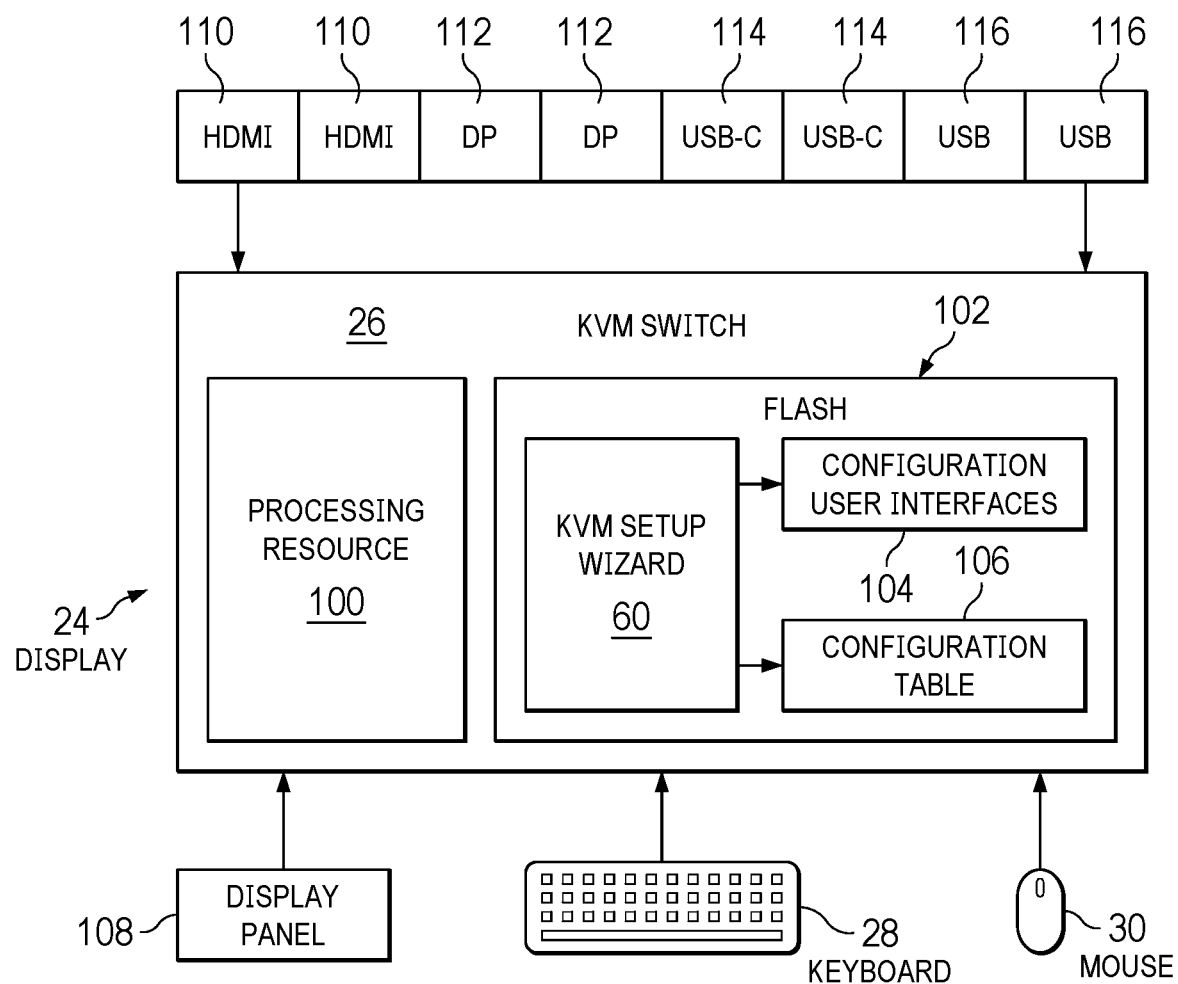
FIG. 2 depicts a block diagram of a KVM switch configured to present configuration user interfaces based upon the types of cables that couple to the display.

Referring now to FIG. 2, a block diagram depicts a KVM switch 26 configured to present configuration user interfaces based upon the types of cables that couple to the display 24. In the example embodiment, KVM switch 26 integrates in display 24, which includes plural ports to interface with information handling systems and peripheral devices. HDMI ports 110 communicate video only through unidirectional video-only cables with a video source information handling system. DisplayPort ports 112 communicate video/data with a bi-directional video/data cable having a large bandwidth for communication of video information from an information handling system to display 24 and an auxiliary channel that communicates limited data from display 24 to the information handling system, such as input information from keyboard 28 and mouse 30. USB-C ports 114 have bidirectional video/data cables that support both visual information communication to display 24 from an information handling system and data from keyboard 28 and mouse 30 to the information handling system. Older USB-A ports 116 have data-only cables since these ports lack the bandwidth to communicate video. When a video-only cable, such as HDMI, is used to communicate visual information from an information handling system to display 24, a separate cable has to be used to communicate keyboard 28 and mouse 30 inputs to the information handling system from the display. The data communication may be supported by a data-only cable like USB-A or a video/data cable like USB-C. KVM switch 26 accepts keyboard and mouse inputs and switches the inputs to the information handling system data or video/data port and cable for the information handling system that is presenting visual images at the display panel 108 of display 24. When an end user selects a different information handling system for presentation of visual images at display panel 108, KVM switch 26 provides the visual image information for the selected information handling system to display panel 108 and switches inputs of keyboard 28 and mouse 30 to that information handling system.

KVM switch 26 has a processing resource 100, such as an MCU, that executes instructions to process information and manage switch operations. A non-transitory memory, such as a flash memory 102, stores the instructions and information that executes on processing resource 100 to manage switch operations. When an end user initiates a change to a configuration of information handling systems interfaced with display 24, a KVM setup wizard 60 is retrieved from flash 102 and executed on processing resource 100 to present configuration user interfaces to an end user that assist in the correct configuration of KVM switch 26. For example, KVM setup wizard may be initiated by an end user selection of an input button of display 24 or may be initiated automatically in response to detection of a cable inserted into one of ports 110, 112, 114 and 116. KVM setup wizard 60 detects the ports that have a cable connected and looks up in a configuration table 106 to find a matching configuration of cable connections. KVM setup wizard 60 then retrieves a configuration user interface 104 that matches the detected cable configuration and presents the configuration user interface at display panel 108. The specific correlation between configuration user interfaces and detected port connections may vary for each display 24, however, the correlation will generally relate to whether detected cables have video-only, data-only or video/data capabilities. The selected configuration user interface will visually present to the end user the alternatives available for the configuration of the display based upon the existing cable connections and confirmation of a correct association by the switch to the desired information handling system for presenting visual images and provide keyboard and mouse inputs to the information handling system that generated the visual images.

Figure 3:
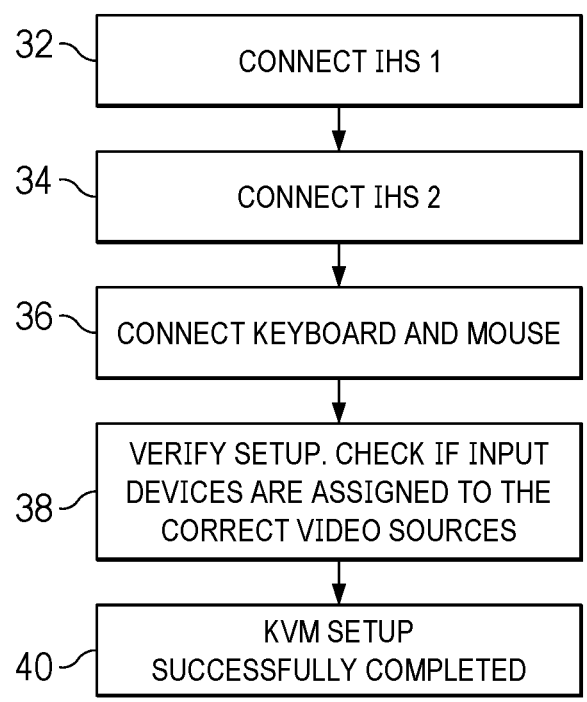
FIG. 3 depicts a flow diagram of a process for configuration of a KVM switch to coordinate interactions with plural information handling systems.

Referring now to FIG. 3, a flow diagram depicts a process for configuration of a KVM switch to coordinate interactions with plural information handling systems. At step 32 a first information handling system is connected to the display. When only one information handling system is connected, the KVM switch need only present visual images of that one information handling system and pass inputs of input devices to that one information handling system. At step 34, a second information handling system connects to the display so that the KVM switch can coordinate presentation of visual information from either information handling system, such as in response to a toggle selection by an end user that changes the active information handling system selected for presenting visual images. Generally, once the KVM switch associates video ports and data ports with information handling systems, the data ports are used in association with the video ports for each information handling system. At step 36 a keyboard and mouse are connected to the display to provide inputs through the KVM switch to the information handling system. At step 38 the setup of the information handling system and input devices are verified by confirming that the KVM switch sends inputs to the information handling system that is actively presenting visual images. If inputs made at the keyboard and/or mouse do not show up on the display, the association of keyboard and mouse with the information handling system is changed. Once at step 40 the KVM switch correctly associates the information handling system visual image presentation and the input devices, the setup process is complete.

Figure 4:
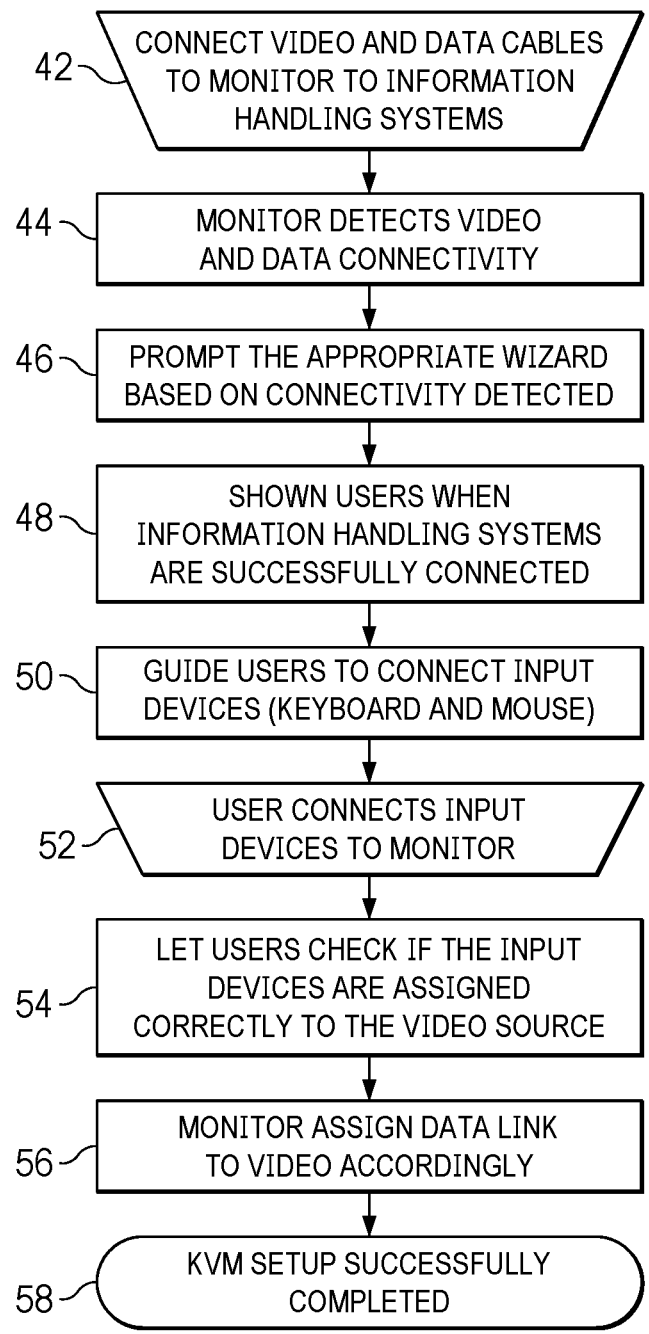
FIG. 4 depicts a flow diagram of process for configuration of a KVM switch with selection of configuration user interfaces by the KVM switch based upon cable types used to interface the information handling systems with the KVM switch.

Referring now to FIG. 4, a flow diagram depicts a process for configuration of a KVM switch with selection of configuration user interfaces by the KVM switch based upon cable types used to interface the information handling systems with the KVM switch. The process starts at step 42 with the connection of video and data cables to the display monitor from the information handling systems. At step 44 the display monitor KVM switch detects the video and data connectivity for the information handling systems communicated through the cables and to the display monitor ports. At step 46, the display monitor presents an appropriate setup wizard configuration user interface selected based upon the detected port connectivity. The particular configuration user interface that is presented is, for instance, looked up in a table that associates detected cable connections to a list of configuration user interfaces. At step 48 the selected configuration user interface is presented at the display panel and includes a visual depiction of the cable connections that are detected. At step 50, the configuration user interface presents instructions to the end user for the next configuration steps given the detected cable configuration, such as connection of the keyboard and mouse to the display USB-A ports. At step 52 the input devices, such as the mouse and keyboard are connected to the display ports by the end user and detected by the KVM switch. At step 54 a configuration user interface is presented to aid the end user in confirmation or non-confirmation that the input devices are assigned to a correct video source. Once the correct association is established, at step 56 the video and input device correlations are saved and at step 58 the KVM setup is completed.

Figure 5:
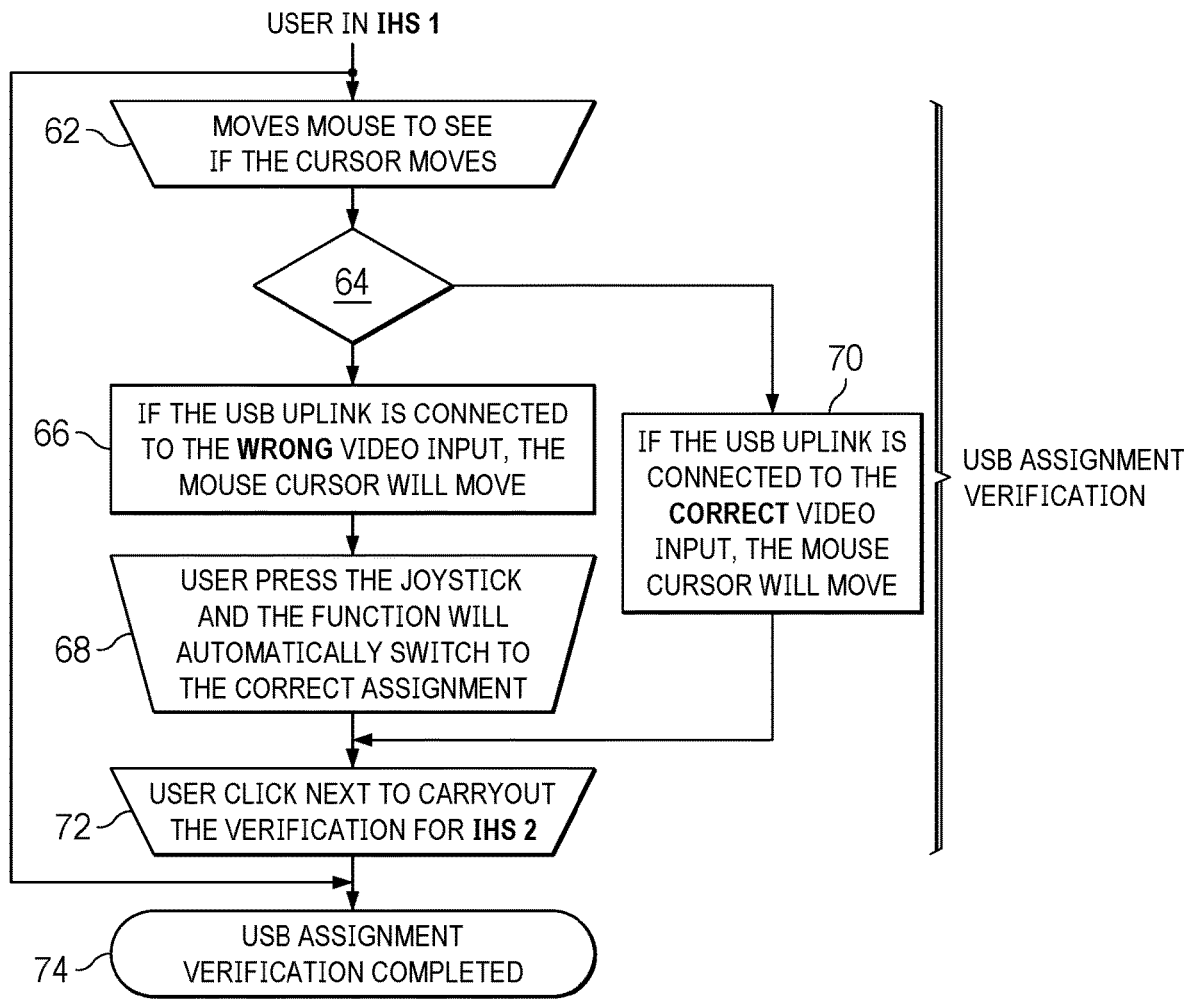
FIG. 5 depicts a flow diagram of a process for confirmation and non-confirmation of KVM switch assignments between information handling systems established by cable type.

Referring now to FIG. 5, a flow diagram depicts a process for confirmation and non-confirmation of KVM switch assignments between information handling systems established by cable type. In a situation where the KVM setup wizard initiates after an end user has connected both information handling systems to the KVM switch, the process may initiate at the data assignment verification process. At step 62, the configuration user interface instructs the end user to move the mouse and observe whether the cursor moves at step 64. If the mouse cursor does not move, the process continues to step 66 with instructions presented to the end user that failure to see mouse move is a non-confirmation of the data and video correlation. At step 68, the end user presses the joystick input button of the display to command a change in the association of the input data and video output. In alternative embodiments, the change may be commanded by a predetermined mouse or keyboard input that is communicated to the information handling system that has the active data link and back to the KVM switch to change the video and data correlation. If at step 64 the cursor movement is visible on the display, the process continues to step 70 with the confirmation of the input devices and video correlation and then continues to step 72. At step 72 the video of the information handling system is confirmed to correlate to the input devices and at step 74 upon confirmation the input device correlation verification is complete.

FIGS. 4 and 5 provide an example setup wizard flow that determines presentation of configuration user interfaces that guide an end user through a setup of a KVM switch of a display, however, the presented instructions may vary based upon the type of display, KVM switch, available ports and information handling system interactions as the setup initiates. As an example, the depicted setup wizard process flows instruct the coupling of the information handling systems before the keyboard and mouse. In an alternative embodiment, the keyboard and mouse may be coupled first so that they are available during the display setup and the later coupling of data cables does not result in confusion for the end user who is handling multiple USB-A cables that include keyboard and mouse cables. Generally, the flow of configuration user interfaces presented to the end user will be selected based upon detection and identification of cable types during the setup process. For example, if a video-only cable couples to the KVM switch, a subsequent configuration user interface will typically present instructions for a data-only cable connection to the same information handling system. As another example, if a USB-C cable connection is data-only, a configuration user interface will typically instruct a video-only cable connection or otherwise direct the end user to confirm a video transfer capability. Alternatively, a data-only USB-C cable connection may prompt presentation of a configuration user interface that instructs the end user to attempt other USB-C ports of the information handling system to determine if a video capability is available from the USB-C ports. In one example embodiment, the KVM switch may select a configuration user interface presentation flow that encourages an end user to configure the display for use in an optimal manner, such as in the selection of video and data cables based upon available ports. For instance, the KVM switch once interfaced by a data-cable may retrieve from the information handling system the available ports of the information handling system and apply the available ports against the KVM available capabilities to suggest alternative cable configurations. For instance, if a USB-C port is used in a data-only capacity while another information handling system could use the USB-C port for video, the setup wizard may present a user interface that suggests an alternative configuration to more efficiently use available ports.

Figure 6:
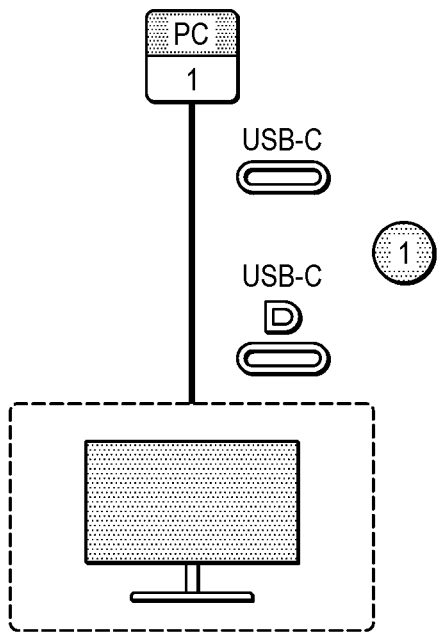
FIG. 6 depicts an example configuration user interface stored in KVM non-transitory memory that is retrieved to coordinate an interface with a first information handling system.

Referring now to FIG. 6, an example is depicted of a configuration user interface stored in KVM non-transitory memory that is retrieved to coordinate an interface with a first information handling system. The user interface of FIG. 6 initiates when an end user indicates an intent to couple two information handling systems to the display KVM by providing instructions to connect the first information handling system with a USB-C cable between a USB-C port of the information handling system and USB-C port of the display. USB-C is a video/data cable that communicates both video and input data through one cable. Presenting this interface first simplifies the connection process because only a single cable connection is needed. If an end user does not connect a USB-C cable and selects next instead, the logic of the KVM switch can proceed to options for communication that do not include USB-C, such as HDMI or DisplayPort as a first selection.

Figure 7:
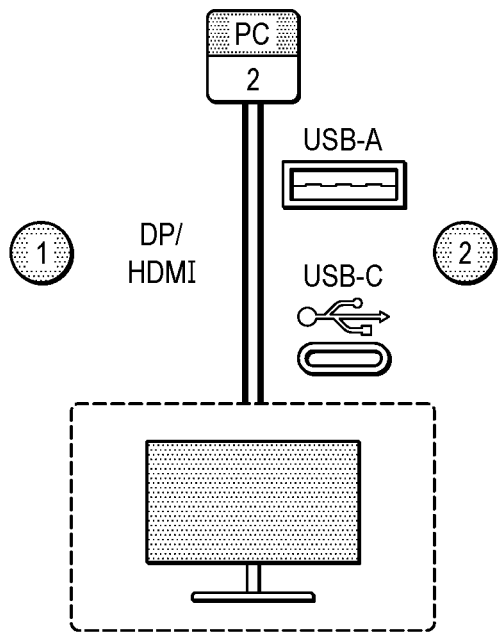
FIG. 7 depicts an example configuration user interface stored in KVM non-transitory memory that is retrieved to coordinate an interface with a second information handling system.

Referring now to FIG. 7, an example is depicted of a configuration user interface stored in KVM non-transitory memory that is retrieved to coordinate an interface with a second information handling system. In the example, the display KVM has interfaced by a USB-C cable and the configuration user interface offers a DisplayPort or HDMI cable option that are each supported by a separate USB-A or USB-C data interface. In a situation where the display KVM already supports an information handling system cable connection when the setup wizard is initiated, the first configuration user interface will show the existing connection and the available cable connection options for the second connection with the information handling system labeled as "2". Because a USB-C cable can support data only or both video and data simultaneously, the instructions specify whether the interface is for just data as opposed to a combination of video and data. After the cables are connected, the KVM switch may confirm the nature of the interface to ensure that each video-only cable interface also supports a data interface.

Figure 8:
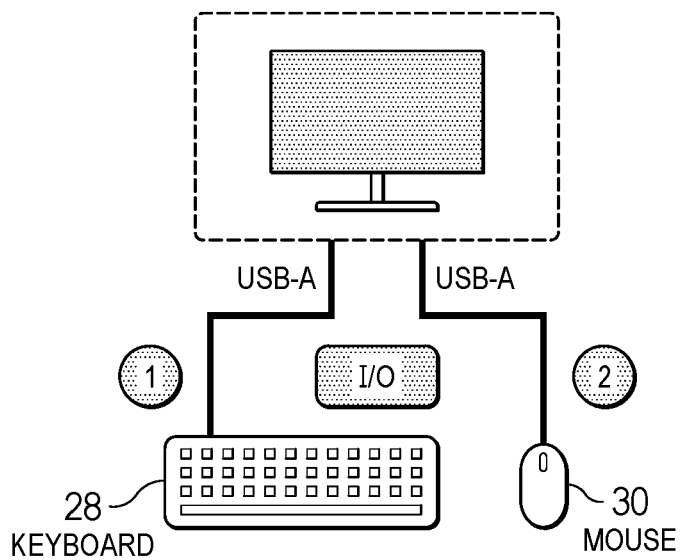
FIG. 8 depicts an example configuration user interface stored in KVM non-transitory memory that is retrieved to coordinate an interface with peripheral devices, such as a keyboard and mouse.

Referring now to FIG. 8, an example is depicted of a configuration user interface stored in KVM non-transitory memory that is retrieved to coordinate an interface with peripheral devices, such as a keyboard and mouse. After the end user has completed the interface of the two information handling systems, the configuration user interface presents instructions to the end user for interfacing a keyboard and mouse to the display. As with the other configuration user interfaces, the instructions for interfacing the keyboard and mouse may be skipped if the KVM switch detects the keyboard and mouse are already connected.

Figure 9:
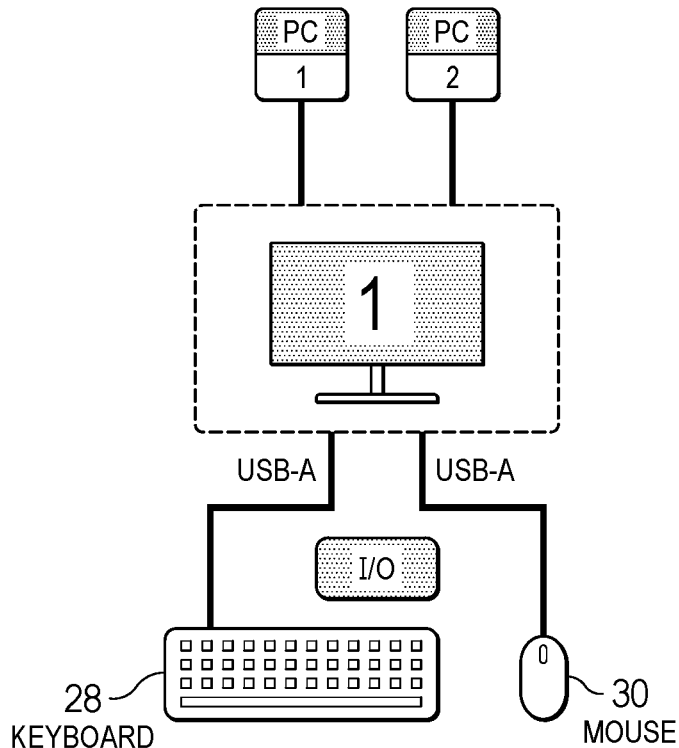
FIG. 9 depicts an example configuration user interface stored in KVM non-transitory memory that is retrieved for presentation to an end user when configuring plural information handling systems to interface with a display through the KVM switch.

Referring now to FIG. 9, an example is depicted of a configuration user interface stored in KVM non-transitory memory are retrieved for presentation to an end user when configuring plural information handling systems to interface with a display through the KVM switch. Once the keyboard and mouse are coupled to the KVM switch, the configuration user interface presents instructions to the end user for moving the mouse to see if cursor movement appears on the display. If no cursor movement appears, the KVM switch has an inverse configuration that sends the mouse position information to the information handling system that is not presenting visual images. In the event that the configuration is non-confirmed, the configuration user interface instructs the end user to reset the configuration and reverse the association of data and video. Once the mouse cursor movement confirms the configuration, the configuration is completed and the setup wizard returns video control to the information handling systems.

Although the present invention has been described in detail, it should be understood that various changes, substitutions and alterations can be made hereto without departing from the spirit and scope of the invention as defined by the appended claims.

What is claimed is:

1. A method for configuring a keyboard, mouse video switch of a display, the method comprising: detecting at the display plural cables coupled to the display, the plural cables coupled to a first or second information handling system; identifying with the display the types of cables coupled to the display; selecting a configuration user interface from plural configuration user interfaces stored in non-transitory memory of the display based upon the types of cables coupled to the display; and presenting the selected configuration user interface at the display with logic executing on a processing resource of the display; wherein the types of cables include video-only cables, data-only cables, and video/data cables; and further comprising: when the one of the types of cables for the first information handling system comprises a video-only cable, presenting instructions at the configuration user interface to couple a data-only cable or a video/data cable for the first information handling system; and associating the data-only cable or video/data cable and the video-only cable with each other.

2. The method of claim 1 further comprising:
coupling a keyboard to the display;
coupling a mouse to the display; and
accepting inputs from one of the keyboard and mouse to interact with configuration user interface.

3. The method of claim 2 further comprising presentation of a message at the configuration user interface that presentation of the inputs confirms the configuration and failure of presentation of the inputs unconfirms the configuration.

4. The method of claim 3 further comprising presentation of instructions to perform a non-confirm input when the failure of presentation of the inputs unconfirms the configuration.

5. The method of claim 4 wherein the non-confirm input comprises an input button on the display, the method further comprising pressing the input button on the display to reverse the first and second information handling system switch assignment.

6. The method of claim 4 wherein the non-confirm input comprises a predetermined input at the one of the keyboard and mouse to reverse the first and second information handling system switch assignment.

7. The method of claim 1 wherein the video only cable comprises an HDMI cable.

8. The method of claim 1 wherein the video/data cable comprises a USB Type-C cable.

9. A display comprising: a display panel operable to present visual images; a keyboard, video, mouse switch having plural ports operable to simultaneously couple to cables of first and second information handling systems to manage selection of one of the first or second information handling systems with the display panel and with a keyboard and mouse interfaced with the display, the keyboard, video, mouse switch having a processing resource operable to execute instructions; and a non-transitory memory storing instruction that when executed on the processing resource cause: detection at the display of plural cables coupled to the display, each of the plural cables coupled to one of the first or second information handling system; identification with the display for the plural cables the type of each of the plural cables coupled to the display; selection of a configuration user interface from plural configuration user interfaces stored in the non-transitory memory of the display based upon the types of cables coupled to the display; and presentation of the selected configuration user interface at the display; wherein the types of cables include video-only cables, data-only cables, and video/data cables; and wherein the instructions further cause: when the one of the types of cables for the first information handling system comprises a video-only cable, presenting instructions at the configuration user interface to couple a data-only cable or a video/data cable for the first information handling system; and associating the data-only cable or video/data cable and the video-only cable with each other.

10. The display of claim 9 wherein the instructions further:
detect a keyboard coupled to the display;
detect a mouse coupled to the display; and
accept inputs from one of the keyboard and mouse to interact with the configuration user interface.

11. The display of claim 10 wherein the instructions further cause presentation of a message at the configuration user interface that presentation of the inputs confirms the configuration and failure of presentation of the inputs unconfirms the configuration.

12. The display method of claim 11 wherein the instructions further cause presentation of instructions to perform a non-confirm input when the failure of presentation of the inputs unconfirms the configuration.

13. The display of claim 12 wherein the non-confirm input comprises a display input button press to reverse the first and second information handling system switch assignment if the input fails to interact with the configuration user interface.

14. The display of claim 12 wherein the non-confirm input comprises a predetermined input at the one of the keyboard and mouse to reverse the first and second information handling system switch assignment.

15. The display of claim 9 wherein the video only cable comprises an HDMI cable.

16. The display of claim 15 wherein the video/data cable comprises a USB Type-C cable.

* * * * *